(12) United States Patent
Müller

(10) Patent No.: US 10,193,430 B2
(45) Date of Patent: Jan. 29, 2019

(54) ELECTROMAGNETIC DEVICE HAVING DISCRETE WIRES

(71) Applicant: Board of Trustees of Michigan State University, East Lansing, MI (US)

(72) Inventor: Norbert Müller, Haslett, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 800 days.

(21) Appl. No.: 14/205,635

(22) Filed: Mar. 12, 2014

(65) Prior Publication Data

US 2014/0265647 A1 Sep. 18, 2014

Related U.S. Application Data

(60) Provisional application No. 61/789,003, filed on Mar. 15, 2013.

(51) Int. Cl.
| | |
|---|---|
| *H02K 1/06* | (2006.01) |
| *H02K 21/16* | (2006.01) |
| *H02K 1/02* | (2006.01) |
| *H02K 1/27* | (2006.01) |

(52) U.S. Cl.
CPC .............. *H02K 21/16* (2013.01); *H02K 1/02* (2013.01); *H02K 1/278* (2013.01)

(58) Field of Classification Search
CPC ........... H02K 21/16; H02K 1/02; H02K 1/278
USPC ......................................... 310/216, 179–210
See application file for complete search history.

(56) References Cited

U.S. PATENT DOCUMENTS

| | | | |
|---|---|---|---|
| 2,857,094 A | 10/1958 | Erwin | |
| 3,248,046 A | 4/1966 | Feltman, Jr. et al. | |
| 3,403,844 A | 10/1968 | Stoffer | |
| 3,452,229 A * | 6/1969 | Pimlott, Jr. ............ | H02K 19/24 310/168 |
| 3,501,090 A | 3/1970 | Stoffer et al. | |
| 3,549,444 A | 12/1970 | Katz | |
| 3,632,460 A | 1/1972 | Palfreyman et al. | |
| 3,645,829 A | 2/1972 | Palfreyman et al. | |
| 3,670,382 A | 6/1972 | Keehan | |
| 3,718,952 A | 3/1973 | Palfreyman et al. | |

(Continued)

FOREIGN PATENT DOCUMENTS

| | | |
|---|---|---|
| DE | 451 236 C | 10/1927 |
| DE | 1 403 611 A1 | 11/1969 |

(Continued)

OTHER PUBLICATIONS

"Filament Winder"; Technical Advertisement from http://atlas.usafa.af.mil/dfem/facilities/myweb/filament.sub.--winder.htm- ; Dec. 14, 2000; 1 page.

(Continued)

*Primary Examiner* — Naishadh Desai

(74) *Attorney, Agent, or Firm* — Harness, Dickey & Pierce, PLC

(57) ABSTRACT

An electromagnetic device includes discrete wires for its poles or teeth. In another aspect, an electromagnetic device includes a stator unit and an adjacent movable unit, at least one of which includes magnetic flux-carrying poles, with a majority of each pole including multiple discrete wires. In another aspect, the movable unit is an electric motor rotor, a linear electric motor armature, a solenoid armature, or an electric generator rotor.

26 Claims, 7 Drawing Sheets

(56) References Cited

U.S. PATENT DOCUMENTS

| | | | |
|---|---|---|---|
| 3,956,651 A * | 5/1976 | Brammerlo | H02K 1/12 310/216.003 |
| 3,977,728 A | 8/1976 | Mitchell et al. | |
| 4,098,559 A | 7/1978 | Price | |
| 4,114,962 A | 9/1978 | Konig et al. | |
| 4,138,629 A * | 2/1979 | Miller | H02K 23/52 310/113 |
| 4,177,397 A | 12/1979 | Lill | |
| 4,182,402 A | 1/1980 | Adrian | |
| 4,255,087 A | 3/1981 | Wackerle et al. | |
| 4,363,602 A | 12/1982 | Martin | |
| 4,367,413 A | 1/1983 | Nair | |
| 4,460,531 A | 7/1984 | Harris et al. | |
| 4,468,269 A | 8/1984 | Carey | |
| 4,483,214 A | 11/1984 | Mayer | |
| 4,553,075 A | 11/1985 | Brown et al. | |
| 4,594,524 A * | 6/1986 | Sudo | H02K 29/08 310/184 |
| 4,676,722 A | 6/1987 | Marchal et al. | |
| 4,701,157 A | 10/1987 | Potter | |
| 4,747,900 A | 5/1988 | Angus | |
| 4,786,347 A | 11/1988 | Angus | |
| 4,817,453 A | 4/1989 | Breslich, Jr. et al. | |
| 4,860,610 A | 8/1989 | Popper et al. | |
| 4,973,521 A | 11/1990 | Graff et al. | |
| 5,108,262 A | 4/1992 | Crane | |
| 5,194,775 A | 3/1993 | Cooper | |
| 5,344,686 A | 9/1994 | Heubert | |
| 5,424,902 A | 6/1995 | Shida et al. | |
| 5,464,325 A | 11/1995 | Albring et al. | |
| 5,562,582 A | 10/1996 | Malekmadani | |
| 5,643,168 A | 7/1997 | Piramoon et al. | |
| 5,717,263 A | 2/1998 | Cox | |
| 5,876,322 A | 3/1999 | Piramoon | |
| 5,921,754 A | 7/1999 | Freitas et al. | |
| 5,944,485 A | 8/1999 | Maumus et al. | |
| 5,951,255 A | 9/1999 | Krenkel et al. | |
| 5,977,679 A * | 11/1999 | Miller | H02K 1/165 310/164 |
| 6,134,109 A | 10/2000 | Muller et al. | |
| 6,154,352 A | 11/2000 | Atallah | |
| 6,181,042 B1 * | 1/2001 | Grant | H02K 3/30 29/596 |
| 6,264,430 B1 | 7/2001 | Hulkkonen et al. | |
| 6,265,798 B1 | 7/2001 | Huang et al. | |
| 6,340,288 B1 | 1/2002 | Hulkkonen et al. | |
| 6,356,001 B1 * | 3/2002 | Nishiyama | H02K 1/148 180/65.1 |
| 6,393,208 B1 | 5/2002 | Nosenchuck | |
| 6,402,467 B1 | 6/2002 | Godichon et al. | |
| 6,583,528 B2 | 6/2003 | Gabrys | |
| 6,590,310 B2 * | 7/2003 | Takano | H02K 3/522 29/596 |
| 6,606,854 B1 | 8/2003 | Siefker et al. | |
| 6,887,032 B2 | 5/2005 | Favre-Felix et al. | |
| 7,125,219 B2 | 10/2006 | Sarin et al. | |
| 7,555,891 B2 | 7/2009 | Muller et al. | |
| 7,567,009 B2 * | 7/2009 | Gu | H02K 3/522 310/216.052 |
| 7,811,062 B1 | 10/2010 | Twigg | |
| 7,868,510 B2 | 1/2011 | Rittenhouse | |
| 7,938,627 B2 | 5/2011 | Muller | |
| 8,253,299 B1 | 8/2012 | Rittenhouse | |
| 8,449,258 B2 | 5/2013 | Muller | |
| 8,506,254 B2 | 8/2013 | Muller | |
| 8,508,095 B2 * | 8/2013 | Husband | H02K 21/44 310/12.24 |
| 2002/0047329 A1 | 4/2002 | Sashino et al. | |
| 2002/0071979 A1 | 6/2002 | DuBose et al. | |
| 2002/0125780 A1 | 9/2002 | Shiratori | |
| 2002/0141894 A1 | 10/2002 | Kirtley et al. | |
| 2002/0175586 A1 * | 11/2002 | Hill | H02K 1/06 310/179 |
| 2003/0000336 A1 | 1/2003 | Tsai | |
| 2003/0025335 A1 | 2/2003 | Elder | |
| 2003/0122445 A1 * | 7/2003 | Takano | H02K 3/522 29/596 |
| 2003/0235502 A1 | 12/2003 | Van Dine et al. | |
| 2005/0046304 A1 * | 3/2005 | Tamaki | H02K 21/046 310/254.1 |
| 2005/0155450 A1 | 7/2005 | Jennings | |
| 2005/0218742 A1 * | 10/2005 | Kawarai | H01F 17/0033 310/179 |
| 2006/0055272 A1 * | 3/2006 | Lee | H02K 1/146 310/208 |
| 2007/0170792 A1 * | 7/2007 | Bott | H02K 3/522 310/71 |
| 2007/0297905 A1 | 12/2007 | Muller | |
| 2008/0122310 A1 * | 5/2008 | Joho | H02K 3/14 310/201 |
| 2011/0200447 A1 | 8/2011 | Muller | |
| 2011/0243770 A1 | 10/2011 | Muller | |
| 2013/0336811 A1 | 12/2013 | Muller et al. | |

FOREIGN PATENT DOCUMENTS

| | | |
|---|---|---|
| DE | 195 43 181 A1 | 5/1997 |
| DE | 297 14 566 U1 | 10/1997 |
| DE | 196 34 043 A1 | 2/1998 |
| FR | 2 504 209 A1 | 10/1982 |
| FR | 2 631 083 A1 | 11/1989 |
| JP | 04368440 A * | 12/1992 |

OTHER PUBLICATIONS

Automated Dynamics; "Thermoplastic Composite Parts" and "Automated Fiber Placement Equipment"; http://www.automateddynamics.com; 2004; 2 pages.

Entec Composite Machines, Inc.; Technical Advertisement for Entec Composite Machines: Filament Winding and Pultrusion Equipment for Composite Manufacturing; http://www.entec.com; (believed to have been published prior to Nov. 2004); 1 page.

Entec Composite Machines, Inc; "Filament Winding"; http://www.entec.com/filament%20winding; (believed to have been published prior to Nov. 12, 2004); 2 pages.

McClean Anderson Technical Advertisement for Advanced Filament Winding Equipment; 2005; 1 page.

McClean Anderson Technical Advertisement for WSH—Super Hornet Winder; 2005; 1 page.

Pottish, N.; "A Filament Winder Buyer's Guide—Aug. 2005"; Composite World; www.compositesworld.com/ct/issues/2005/August/947/3; Aug. 2005; 3 pages.

Mouland, Mark H., et al.; "Preliminary Design Considerations for Integrating a Composite Impeller in a Brushless Permanent Magnet Motor," Proceedings of IMECE2006, 2006 ASME International Mechanical Engineering and Exposition, Nov. 5-10, 2006, pp. 1-9.

* cited by examiner

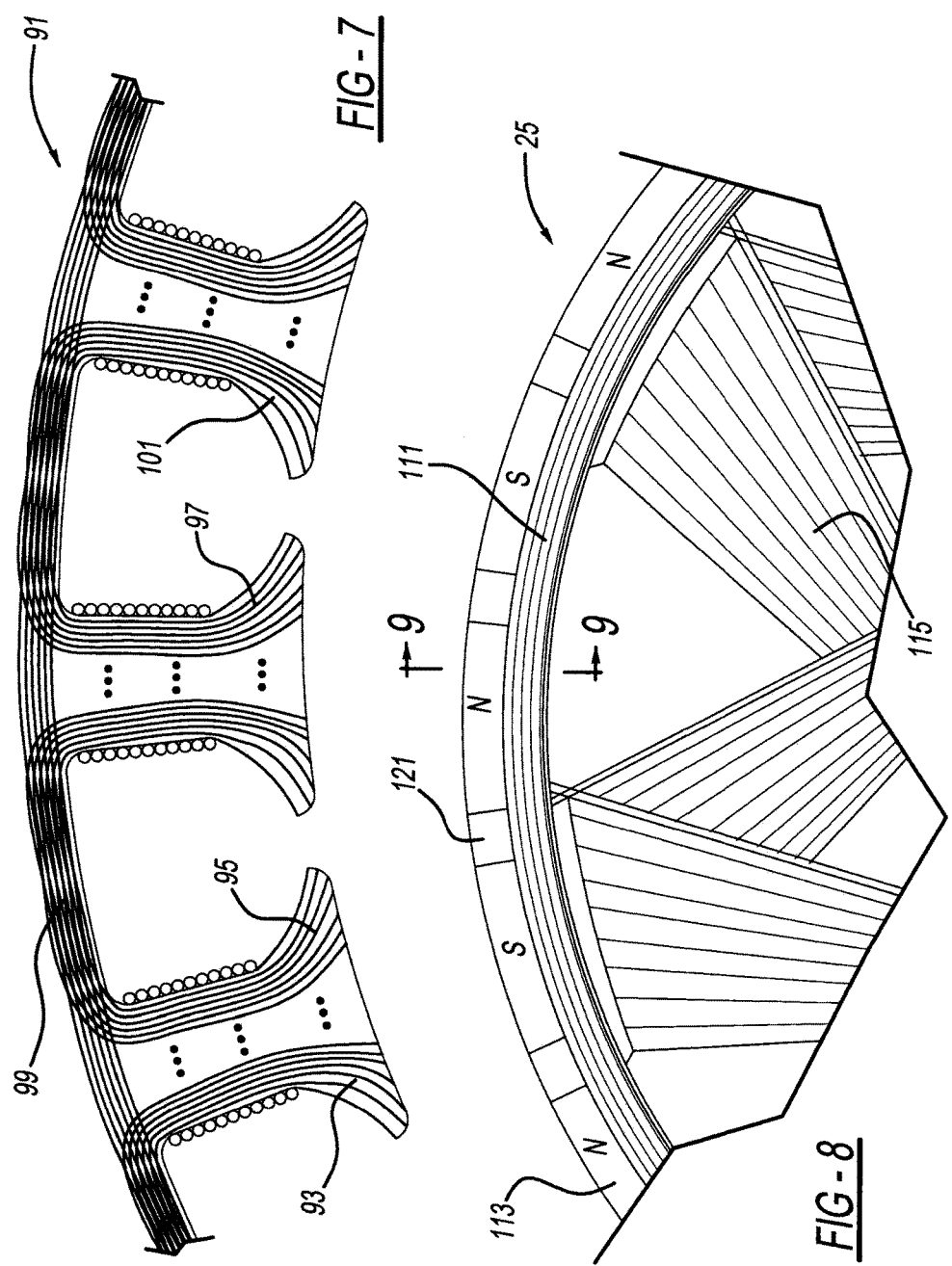

ELECTROMAGNETIC DEVICE HAVING DISCRETE WIRES

CROSS-REFERENCE TO RELATED APPLICATIONS

This application claims the benefit of U.S. Provisional Application No. 61/789,003, filed on Mar. 15, 2013. The entire disclosure of the above application is incorporated herein by reference.

BACKGROUND AND SUMMARY

The present disclosure relates generally to electromagnetic devices and more particularly to an electromagnetic device having discrete wires.

It is well known for an electric motor to have a stator including stacked sheets or laminated metal rings with poles or teeth inwardly projecting therefrom. Inductive wires are commonly wound around a middle of each pole. Examples of such stators are disclosed in U.S. Pat. No. 7,567,009 entitled "Stator Arrangement for an Electric Machine and a Method for Manufacturing the Stator Arrangement" which issued to Gu on Jul. 28, 2009, U.S. Pat. No. 5,194,775 entitled "Electric Motor Stator Tabs" which issued to Cooper on Mar. 16, 1993, and PCT Patent Publication No. WO 2012/118797 entitled "Rotor Apparatus" which published to Müller et al. on Sep. 7, 2012; all of which are incorporated by reference herein. These prior stator and pole designs, however, can be prohibitively expensive to manufacture for low volume production and prototype batches. Furthermore, the conventional Gu and Cooper constructions can also be disadvantageously subject to corrosion damage.

Another electric motor construction is disclosed in U.S. Pat. No. 8,253,299 entitled "Wound Magnetic Flux Channel Transverse Wound Stator Permanent Magnet Motor" which issued to Rittenhouse on Aug. 28, 2012, which is incorporated by reference herein. This arrangement employs coil windings between teeth protruding from a stator rim. The stator rim is an injection molded polymeric part against which a transverse coil winding is also attached. This device, however, will not create the tailored pole shapes desired with the discrete wires of the present invention, and it still requires a separate and preformed stator rim and pole unit with its associated expensive molds and tooling.

In accordance with the present invention, an electromagnetic device includes discrete wires for its poles or teeth. In another aspect, an electromagnetic device includes a stator unit and an adjacent movable unit, at least one of which includes magnetic flux-carrying poles, with a majority of each pole including multiple discrete wires. In another aspect, the movable unit is an electric motor rotor, a linear electric motor armature, a solenoid armature, or an electric generator rotor. A further aspect provides an electromagnetic device having a generally T-shaped tooth with discrete wires extending along a middle throat or leg of the tooth and also within a crossing section of the tooth. In yet another aspect of the electromagnetic device, a stator, rotor and/or armature includes multiple discrete and flux-conducting wires with permanent magnets attached to or closely adjacent to a periphery of at least some of the discrete wires.

The present electromagnetic device is advantageous over conventional constructions. For example, the present device is less expensive to manufacture and requires less capital tooling especially for low production and prototype volumes. Furthermore, the present device advantageously deters corrosion of the stator, rotor and/or armature by encapsulating the discrete wires within a binder, either through a pre-assembly coating, post-assembly molding, vacuum pressure impregnation, spraying or the like. Moreover, the present device can weigh less than traditional devices and the discrete wires also provide load-bearing structural elements, both of which are especially advantageous to counter destructive inertial and/or centrifugal forces acting on a rotating rotor. The present electromagnetic device also advantageously allows for specially customized and tailored shapes for each tooth with minimal tooling expenses. Additional advantages and features of the present invention will become apparent from the following description and appended claims taken in conjunction with the accompanying drawings.

BRIEF DESCRIPTION OF THE DRAWINGS

FIG. 7 is a diagrammatic view, similar to that of FIG. 3, showing a stator of a third embodiment electromagnetic device of the present invention;

FIG. 8 is an enlarged and fragmentary, true elevational view showing a rotor of the first embodiment electromagnetic device;

DETAILED DESCRIPTION

Figure 1:
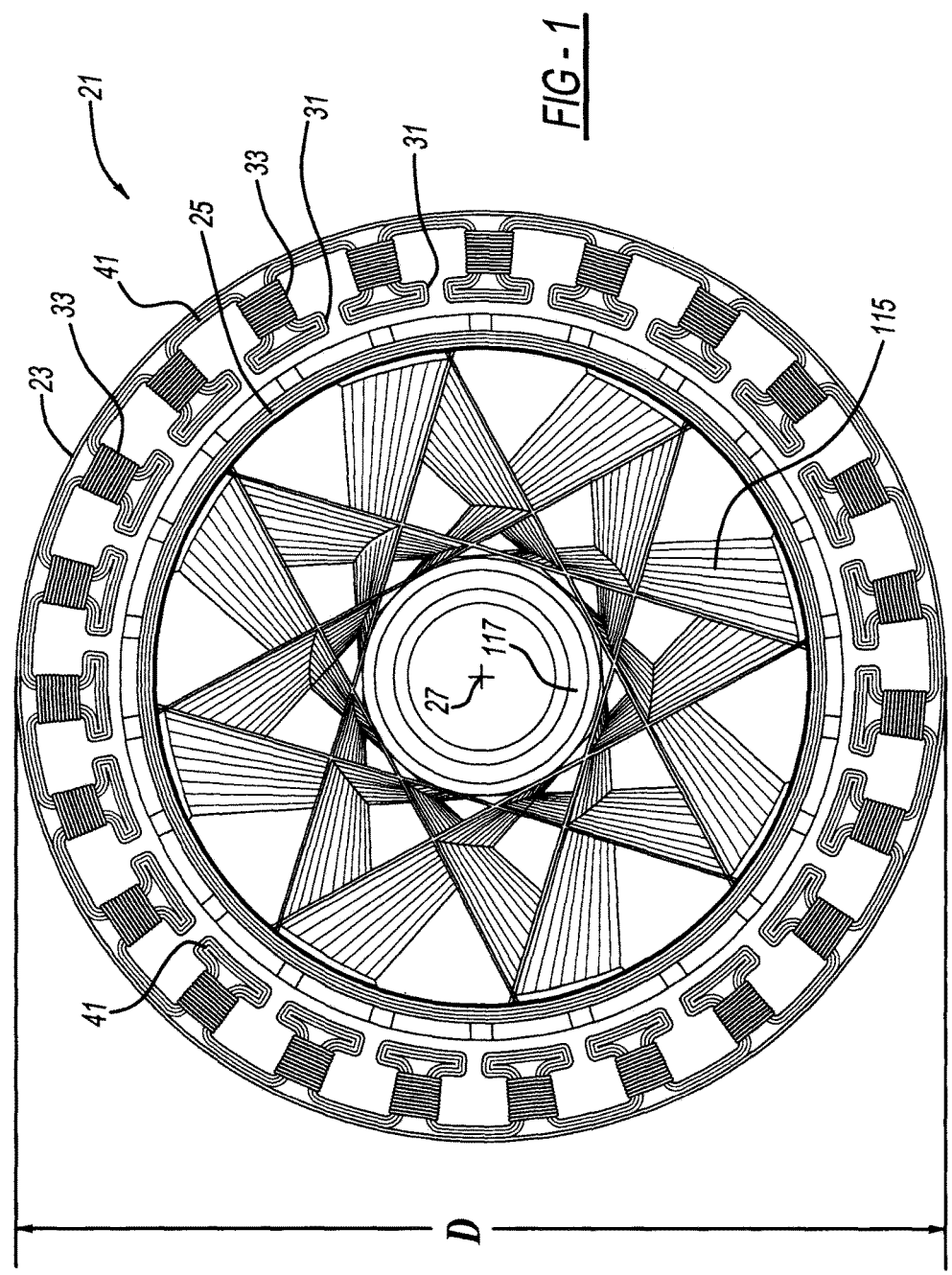
FIG. 1 is a true elevational view showing a first embodiment electromagnetic device of the present invention.

A preferred embodiment of an electromagnetic device 21 is illustrated in FIG. 1. Electromagnetic device 21 includes a stationary stator 23 surrounding a rotor 25 which rotates about a central axis 27. The electromagnetic device of this embodiment is either an electric motor or an electricity generator.

Referring to FIGS. 1-4, stator 23 includes a plurality of inwardly projecting poles or teeth 31, each having a generally T-shape defined by the central throat 35 and a crossing section 37. One or more electricity conducting wires 33 are wound around a throat 35 of each pole 31 generally perpendicularly to an elongated radial pole direction. Poles 31 are equally spaced apart from each other. Furthermore, crossing sections 37 are internally closest to rotor 25 and spaced apart from an outer periphery of rotor 25 by an optional air gap therebetween.

Multiple discrete wires 41 constitute at least a majority of each pole 31. In one option, the multiple wires can be a single continuous wire. These discrete wires 41 extend the radial length of throat 35 and also extend along and within the periphery of crossing section 37 of each pole 31. Additionally, discrete wires 41 bridge between adjacent pairs of poles 31 along a bridging section 43. Accordingly, discrete wires 41 project in a somewhat perpendicular direction along the radially extending throat of each pole relative to the arcuate bridging direction between the poles. These discrete wires 41 serve to carry and then either transmit magnetic flux induced by the externally surrounding electricity carrying wire 33 or receive magnetic flux induced by the rotor, depending upon whether electromagnetic device 21 is acting as an electric motor or generator. At least ten, and more preferably at least fifty, discrete and separate wires 41 extend along the throat and crossing section of each pole 31. But again, a single continuous wire can optionally be used if it is wound ten or more times around all of the stator poles. Each flux conducting wire 41 is preferably less than one millimeter in diameter d if of a circular cross-sectional shape (or width direction if of a rectangular cross-sectional shape) if an outer diameter D of stator 23 is less than or equal to one meter, and a wire diameter of between one tenth of a millimeter to three millimeters is preferred if the stator outer diameter is greater than one meter. Smaller diameter wires 41 are preferred since undesirable eddy currents are induced in larger diameters by the magnetic flux. Nevertheless, larger diameters may be used but without certain advantages. Wires 41 may be made from steel, nickel-alloys, Permalloy, Mu-metal, Nanoperm, or strips of Metglas or other material of relative permeability larger than 1.

A method of manufacturing a stator of an electromagnetic device includes binding together discrete wires 41 with a polymeric and electrically non-conductive (i.e., insulating) epoxy resin 45, silicon, ceramic, or varnish binder. Epoxy resin 45 can be applied to discrete wires 41 after the discrete wires have been laid up in a fixture or it can be applied to each individual wire 41 by coating process prior to laying up and inserting each wire into the fixture, or both in combination. The binder can be pre-assembly coated, or post-assembly molded, vacuum pressure impregnated by dipping the wires into a liquid binder bath, sprayed, or the like. However, in any case it is preferable to electrically insulate the wires in the direction where laminations are insulated to minimize electrical eddy currents. Optionally, this can be done by using layers of paper (e.g., Nomax), plastic foil and any other insulating (best with thin high electrical resistance) material. Thereafter, the epoxy resin is cured such as by heat in an oven, ultraviolet light, ambient air curing, or the like. It should be appreciated, however, that other polymeric binding resins or materials may be employed to secure together the discrete wires in their desired final shape, and they are preferably by optionally magnetically conductive (i.e., high permeability) and heat resistant. The manufacturing method further employs an assembly fixture for manual or automated laying up or stacked layering of discrete wires 41 which may be a wooden, fiberglass or metallic base with upstanding pins at the inside corners of each tooth 31, machined wood or aluminum walls of a mold defining the exact inside and/or outside stator shapes, or various combinations thereof. Such a low-cost fixture and assembly process are ideally suited for low-volume production and prototyping which also allows for relatively fast part-to-part customization and tailoring of tooth shapes, thicknesses, dimensions and the like.

Figure 2:
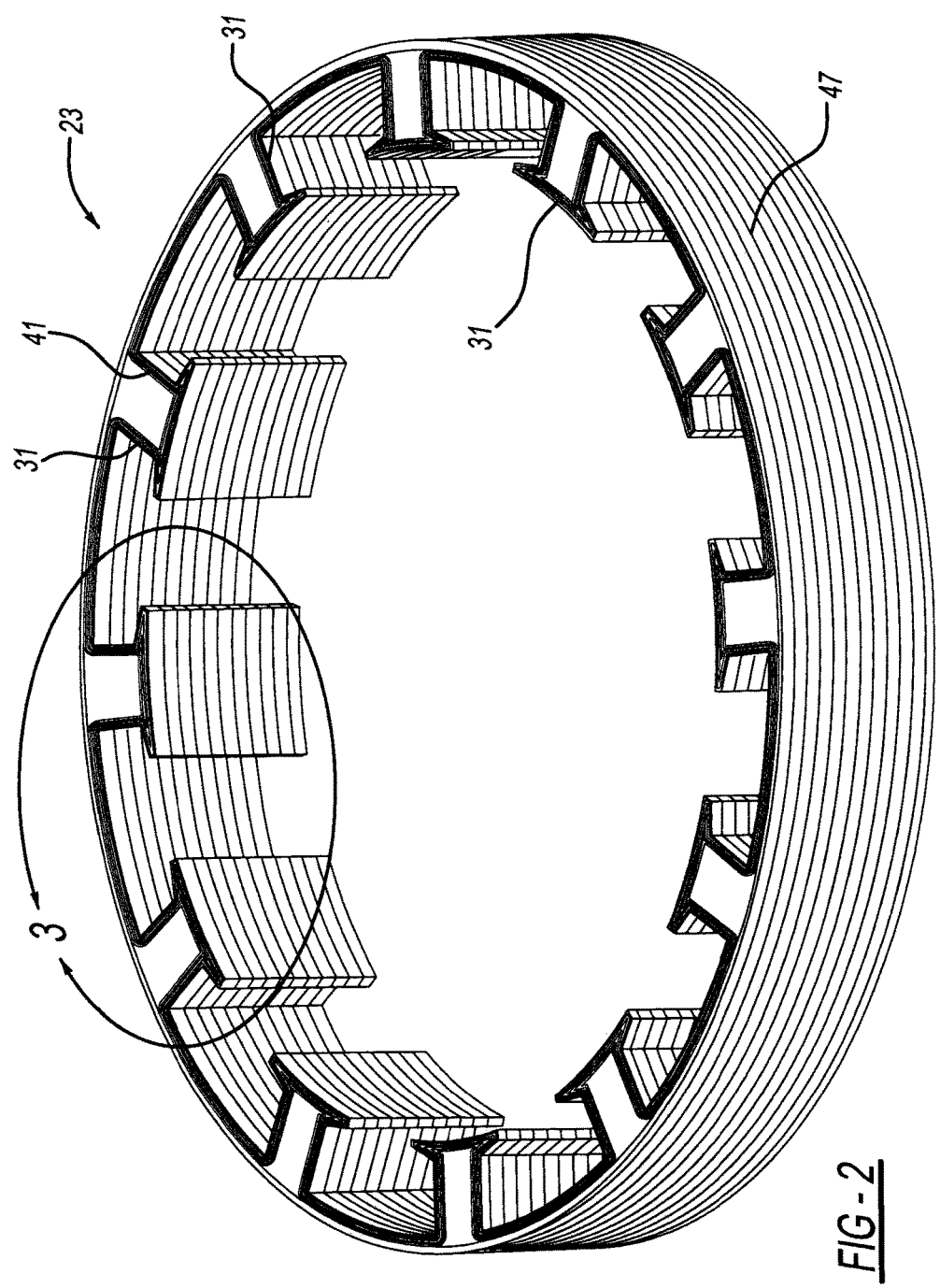
FIG. 2 is a perspective view showing a stator of the first embodiment electromagnetic device.
Figure 3:
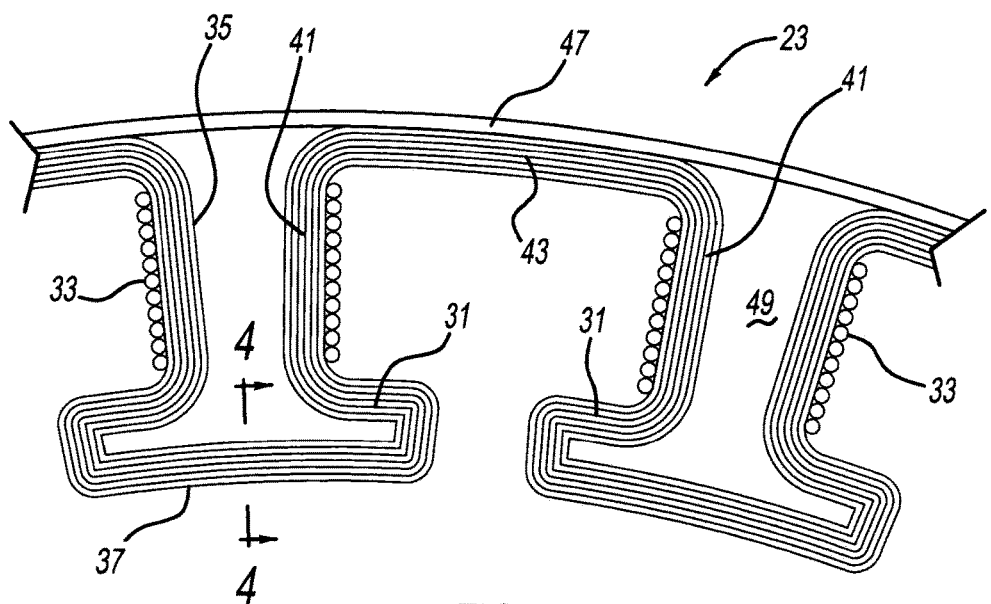
FIG. 3 is a true diagrammatic view, taken within circle 3-3 of FIG. 2, showing the stator of the first embodiment electromagnetic device.
Figure 4:
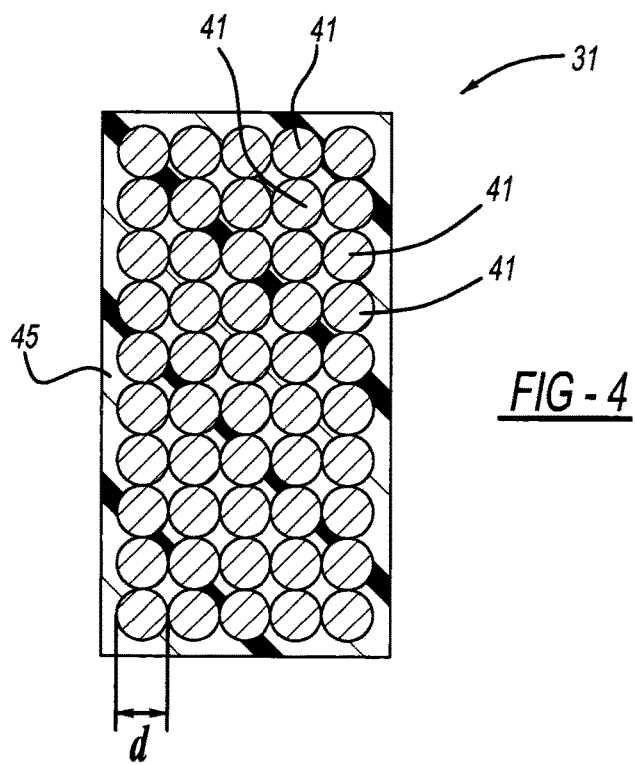
FIG. 4 is a cross-sectional view, taken along line 4-4 of FIG. 3, showing the stator of the first embodiment electromagnetic device.

Depending upon the specific use for and structural rigidity desired of stator 23, an outer wall 47 can either be defined by multiple bound together and magnetically flux-conducting discrete wires (as is shown in FIG. 2), long strand and epoxy bound carbon or glass fibers, a shell of tubular metal with a corrosion resistant coating thereon, stainless steel, or the like. If discrete wires, they can have either square, rectangular or round cross-sectional shapes, square being easier to stack. Outer wires 47 may also be intermingled with the pole-forming wires. An interior area 49 is defined by an interior surface of each tooth 31 and outer wall 47. Interior area 49 may be left hollow to allow air flow therethrough (either forced by a fan or ambient), may serve as a water or silicon oil cooling passageway, filled with wires, or can be filled by a semi-structural material such as a high temperature and rigid foam or other polymeric resin or heat conducting material.

Figure 5:
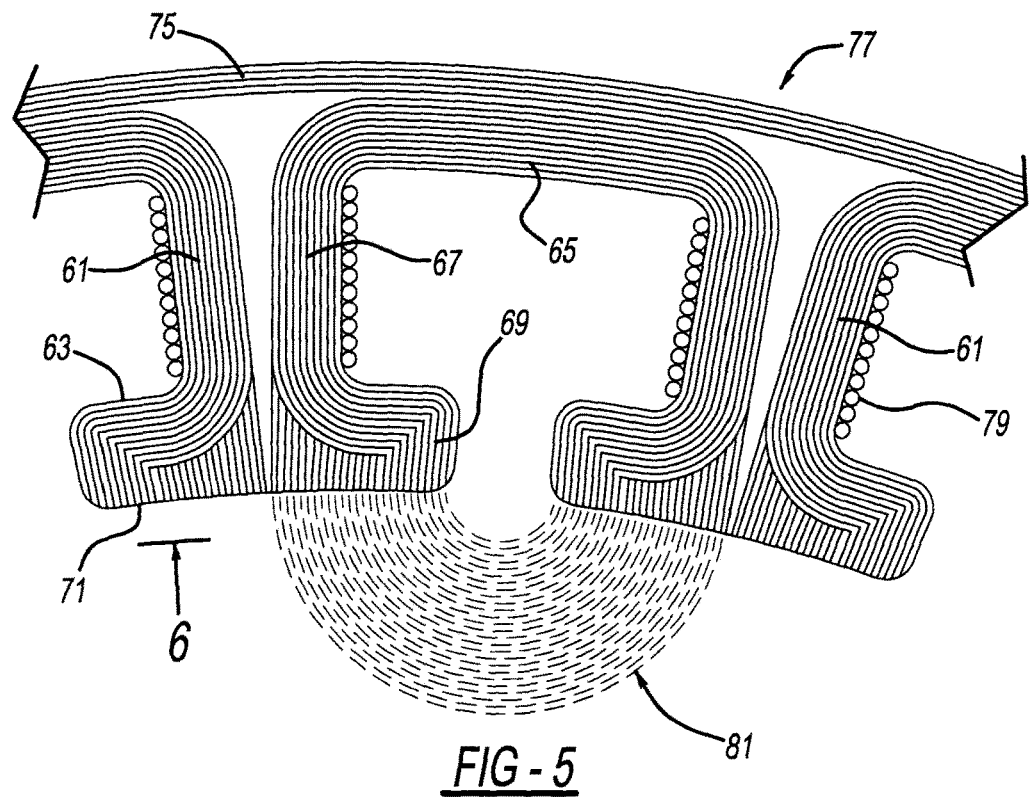
FIG. 5 is a diagrammatic view, similar to that of FIG. 3, showing a stator of a second embodiment electromagnetic device of the present invention.
Figure 6:
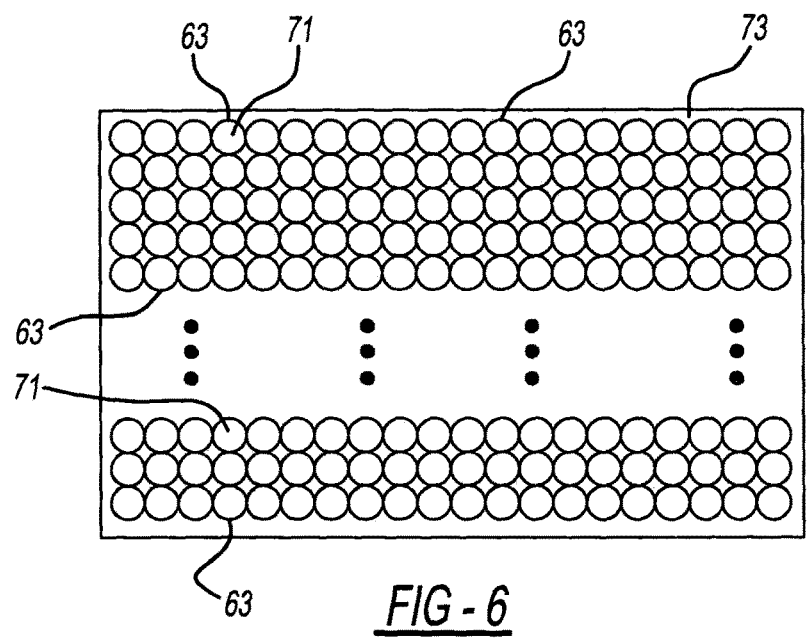
FIG. 6 is an end elevational view, taken in the direction of arrow 6 in FIG. 5, showing the stator of the second embodiment electromagnetic device.

FIGS. 5 and 6 illustrate another stator embodiment wherein each pole or tooth 61 includes multiple discrete wires 63 extending from a generally arcuate bridging segment 65, then radially along a middle throat segment 67 and then within a crossing segment 69 for a T-shaped tooth 61. This version, however, is different than the prior embodiment since the present one employs exposed distal ends 71 of each discrete wire 63. Discrete wires 63 are encapsulated and bound together within an epoxy resin 73 or the like. While the term "exposed" is used to describe distal end 71 of each wire 63, it should be appreciated that the epoxy resin or other coating covers these ends as additional protection as long as it does not significantly reduce the magnetic conductivity therethrough, if the wires 63 are not sufficiently corrosion resistant. When manufactured, ends 71 of wires 63 may be pre-severed prior to their lay up in the assembly fixture, or they may be post-cut within the fixture after being laid up but prior to in-mold pouring or spraying the epoxy resin coating.

In another version, after the discrete wire layers are layed into the fixture, the resin is molded and then the wire ends 71 are cut, whereafter ends 71 remain exposed if the wires 63 are sufficiently corrosion resistant. Still a coating can be sprayed on after the machined cutting. Resin binder molding first before end machining gives better stability during the cutting, hence higher precision. Thus, this version lays up, molds, machines, and then optionally spray coats ends 71.

Circumferential discrete wires 75 can optionally be provided around and within a periphery of stator 77 to provide structural rigidity and/or aid in magnetic conductivity between teeth 61. Coils of electrically conductive wires 79 are also provided as with the prior embodiment. It is expected that the exposed end construction for discrete wires 63 of stator poles 61 will provide an advantageous pattern of magnetic flux 81 between adjacent poles for rotating the internally spaced rotor such as that of the prior embodiment. Furthermore, as with the prior embodiment, discrete wires 63 constitute at least a majority, and preferably all but for the epoxy resin, of each pole 61.

Another embodiment of a stator 91 is illustrated in FIG. 7. In this figure, each pole or tooth 93 has a generally T-shape, albeit, more smoothly curved at the periphery between the throat and crossing section than that of the prior embodiments. Each pole 93 employs an exposed cut end construction for multiple discrete wires 95 therein. It is noteworthy, however, that discrete wires from pole 93 skip over the immediately adjacent pole 97 along bridging segments 99 and perpendicularly turn into a throat of the third tooth 101. All of the discrete wires follow this pole skipping pattern around the entire circumference of stator 91. It is also envisioned that discrete wires 95 can instead skip over two adjacent poles and return into every fourth pole. Such an alternating pattern can be employed with either the exposed end wire construction shown or with the continuous wire construction of FIG. 3.

Figure 9:
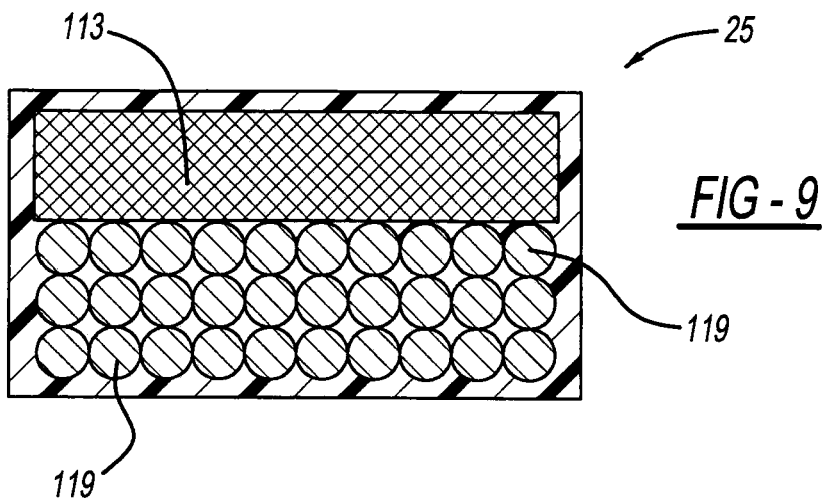
FIG. 9 is a cross-sectional view, taken along line 9-9 of FIG. 8, showing the rotor of the first embodiment electromagnetic device.

As can be observed in FIGS. 1, 8 and 9, rotor 25 includes a peripheral shroud 111 upon which is affixed a plurality of permanent magnets 113. Shroud 111 is part of a woven impeller which includes stacked and intersecting, multiple long strand fiber and resin vanes 115 and a central hub 117. The woven impeller is made in accordance with U.S. Pat. No. 7,938,627 entitled "Woven Turbomachine Impeller" which issued to the present inventor on May 10, 2011, and also PCT Publication No. WO 2012/118797, both of which are incorporated by reference herein. In the present situation, shroud 111 includes one continuous wire 119, or in other constructions at least five, and more preferably at least fifteen, discrete magnetically conductive wires 119 which are wound around a periphery of shroud 111 for at least 360° and more preferably in a continuously wound manner circling the entire shroud at least five times. Permanent magnets 113 are secured to an exterior of shroud 111 thereby optionally and preferably contacting against at least some of the discrete wires 119, such as through epoxy resin encapsulation of both permanent magnet 113 and wires 119. Optional insulating or magnetic flux conducting spacers 121 may be employed between adjacent pairs of permanent magnets 113. It is also envisioned that the discrete wire features are useable with conventional and unwoven rotors, such as those made from cast, machined, or stamped metal or even molded polymeric rotors, although many of the present advantages may not be realized.

Figure 10:
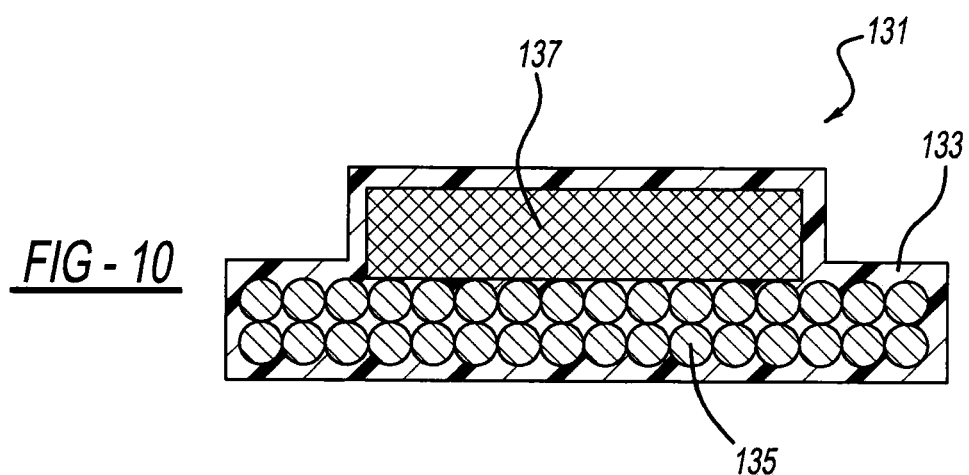
FIG. 10 is a cross-sectional view, similar to that of FIG. 9, showing a rotor of a fourth embodiment electromagnetic device of the present invention.

FIG. 10 illustrates a different configuration of a rotor 131. In this construction, shroud 133, including multiple discrete magnetically conductive wires 135, is axially wider than each permanent magnet 137. This can be employed if additional structural rigidity is desired for the shroud to better counter destructive inertial and/or centrifugal forces during rotation of rotor 131.

Figure 11:
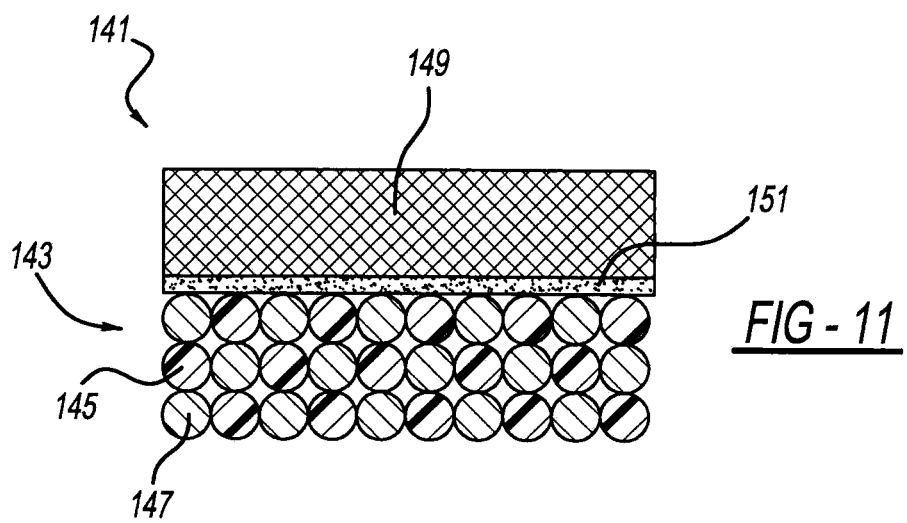
FIG. 11 is a cross-sectional view, similar to that of FIG. 9, showing a rotor of a fifth embodiment electromagnetic device of the present invention.

Another embodiment of a rotor 141 is illustrated in FIG. 11. Shroud 143 includes both nonmagnetic flux conductive fibers 145 and magnetically conductive discrete wires or fibers 147 which are secured together. A permanent magnet 149 is then secured to fibers and wires 145 and 147, such as through an adhesive 151, a fiber wrapped laterally around the magnets and shroud, or the like. Non-conductive fibers 145 are long strand (for example, each being longer than five centimeters, and more preferably longer than one meter) and discrete nonmagnetic flux conductive wires 147 are metallic or even carbon fibers of a long strand variety. Wires 147 may alternately have a perpendicular or obliquely angled orientation. This provides for both structural rigidity and induction where desired. Also magnetic flux conductivity elements like discrete wires can be incorporated between the permanent magnets mounted thereto. If used for an induction machine without magnets, the electrically conductive carbon and/or metallic fibers are in an axial direction, perpendicular to the magnetic flux conducting wires, in the shroud or hub of the rotor. It is also envisioned that discrete magnetic flux conducting wires and/or wires 147 can be used in combination with resin containing short fibers.

Figure 12:
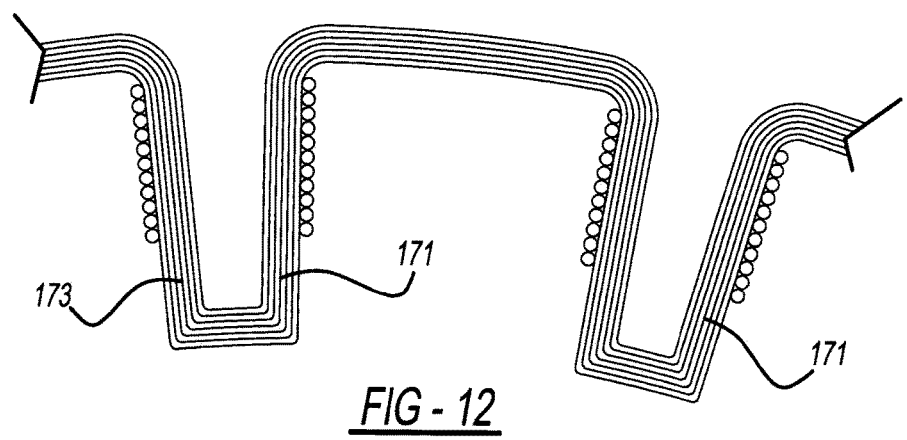
FIG. 12 is a diagrammatic view, similar to that of FIG. 3, showing a stator of a sixth embodiment electromagnetic device of the present invention.
Figure 13:
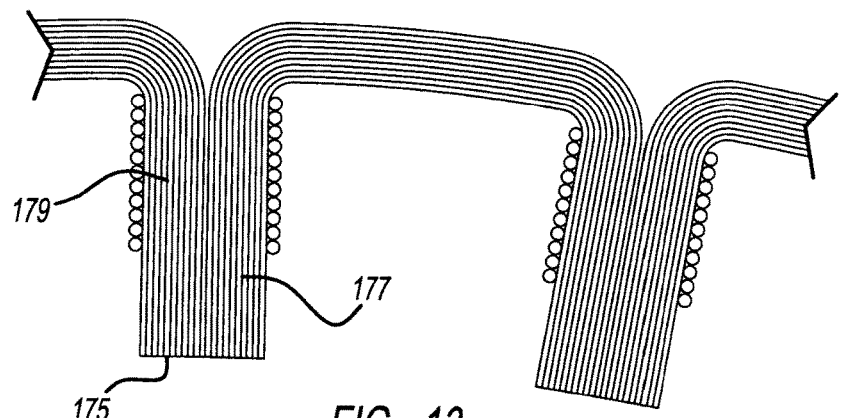
FIG. 13 is a diagrammatic view, similar to that of FIG. 3, showing a stator of a seventh embodiment electromagnetic device of the present invention.

Another stator embodiment is illustrated in FIG. 12 wherein each pole 171 has a generally straight and radial throat direction of elongation without a crossing section. In the FIG. 12 construction, a generally continuous discrete wire 173 pattern is employed. Alternately, an embodiment shown in FIG. 13 employs exposed cut ends 175 for the multiple discrete wires 177 in each pole 179 which are bound together and fill the entire cross sectional area of each pole. A variation includes manufacturing the generally straight poles from a single continuous wire 177, wound around the stator multiple times in a layered manner, that then has its pole ends 175 cut after layering up and resin binder molding.

Figure 14:
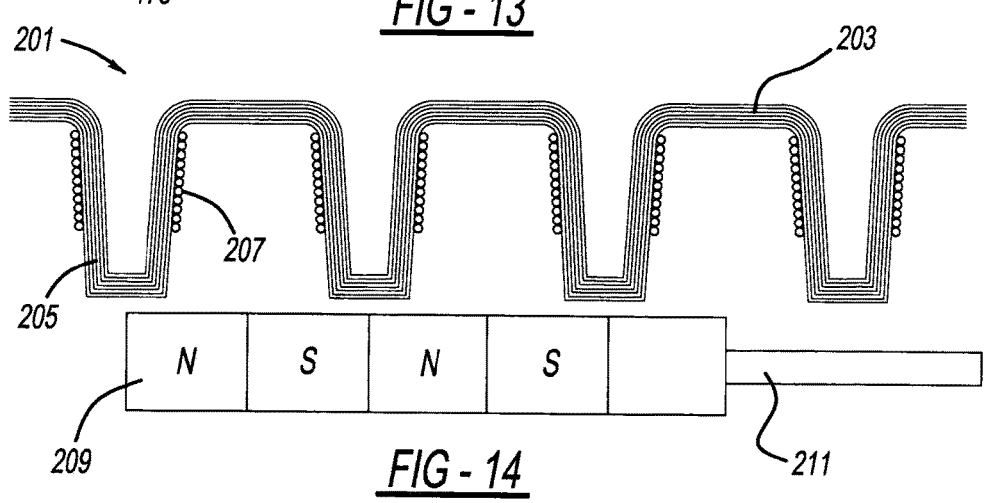
FIG. 14 is a diagrammatic view showing a linear actuator of an eighth embodiment electromagnetic device of the present invention.

A linear actuator 201, such as a solenoid or linear motor, can be observed in FIG. 14. A stationary stator 203 includes multiple poles 205 which can be either of a generally straight configuration (as shown) or the generally T-shape. Inductive wire windings 207 are wound along a throat of each pole 205 for creating magnetic flux within the internally extending discrete wires 205. When energized, this causes permanent magnets 209 on an armature 211 to linearly move between retracted and advanced positions or vice versa.

While various embodiments have been disclosed, it should be appreciated that other variations are envisioned. For example, all of the discrete wire pole configurations disclosed for stators herein can instead be reversed and used on poles radially extending from a rotor or armature, with the stator internally containing permanent magnets or otherwise being electrically magnetized. The discrete wire pole constructions can also be used for reluctance motors and induction motors. Moreover, it is envisioned that the discrete wire pole and/or shroud constructions may be used to create electromagnetic bearings between a moving and stationary part. Individual elements or features of a particular embodiment are generally not limited to that particular embodiment, but where applicable, are interchangeable and can be used in a selected embodiment even if not specifically shown or described. These and other variations are not to be regarded as a departure from the disclosure and all such modifications are intended to be included within the spirit of the present invention.

The invention claimed is:

1. An electromagnetic device comprising:
a stator unit;
a movable unit located adjacent the stator unit;
at least one of the units having poles, a majority of each pole including multiple discrete wires operable to transmit magnetic flux to or receive magnetic flux from the other unit;
an electrically conductive wire winding wound around an inwardly and radially extending throat of each pole substantially perpendicular to an elongated direction of the discrete wires extending through the throat of the pole, a radial outermost portion of each of the throats being defined at an intersection of a bridging section perpendicularly spanning between an adjacent pair of the poles; and
an outer wall including a member being at least one of: at least one of the discrete wires or an elongated fiber, which continuously and peripherally surrounds outermost radial portions of all of the poles and the bridging sections.

2. The electromagnetic device of claim 1, wherein:
the movable unit is a rotor including permanent magnets, the rotor operably rotating within the surrounding stator unit;
multiple long strand fiber and resin vanes connected to a central hub; and
magnets entirely externally mounted to elongated wires of the rotor.

3. The electromagnetic device of claim 1, wherein each pole has a substantially T-shape with a crossing section of the T-shape being closest to the movable unit and the electrically conductive wire winding being wound around the throat defined by a middle leg of the T-shape, and a hollow space is located at a center of each of the poles surrounded by the electrically conductive wire winding.

4. The electromagnetic device of claim 1, wherein:
the stator and movable units are part of an electromagnetic motor;
the multiple discrete wires continuously extend to create more than two of the poles; and
the outer wall includes continuously elongated and multiple stacked loops of the member.

5. The electromagnetic device of claim 1, wherein:
the stator and movable units are part of an electromagnetic generator;
the multiple discrete wires continuously extend to create more than two of the poles; and
the outer wall includes continuously elongated and multiple stacked loops of the member.

6. An electromagnetic device comprising:
multiple poles each including at least ten discrete wires secured together with a binder;
the discrete wires extending in a first elongated direction spanning between more than two of the poles;
the wires including a bridging section extending in a second direction substantially perpendicular to the first direction along a majority of each pole;
each of the poles having an internally enclosed hollow area, the hollow area including a radially elongated portion at a throat which is defined between the bridging section and an innermost end of each of the poles closest to a centerline axis of the device; and
the discrete wires being adapted to conduct magnetic flux along each of the poles.

7. The electromagnetic device of claim 6, wherein:
the binder is a polymeric resin;
the hollow space is located at a center of each of the poles and has a T-shape; and
at least one of the discrete wires encloses a distal end and sides of the hollow space.

8. The electromagnetic device of claim 6, wherein the binder is a silicon material.

9. The electromagnetic device of claim 6, wherein the binder is a ceramic material.

10. The electromagnetic device of claim 6, further comprising a circular periphery of a stator including at least one of the discrete wires that also define the at least two of the poles, wherein an entire structural portion of the stator and the poles are solely made of only the wires and the binder.

11. An electromagnetic device comprising:
a stator unit;
a movable rotor unit located adjacent the stator unit;
at least one of the units having poles, a majority of each pole including multiple discrete wires operable to transmit magnetic flux to or receive magnetic flux from the other unit;
an electrically conductive wire winding wound around a radially extending throat of each pole substantially perpendicular to an elongated direction of the discrete wires extending through the throat of the pole;
a majority of the stator including layers of at least one of the discrete wires that is separate from the electrically conductive wire winding, the layers of the at least one discrete wire providing a load-bearing structural support wall to the stator and the poles;
the layers of the at least one discrete wire circumferentially surrounding radially outermost portions of all of the poles, having stacked loops, and being entirely circular and coaxial with a centerline axis of the at least one of the units; and
a binder resin securing together the discrete wires;
the poles and wall being entirely made of at least two of: the discrete wires, the electrically conductive wires and the resin.

12. The electromagnetic device of claim 11, wherein the layers of at least one of the discrete wires are formed by a single continuous wire having a plurality of runs that abut one another.

13. The electromagnetic device of claim 11, wherein the layers of at least one of the discrete wires define a majority of each of the poles with a T-shaped hollow space in a center of each of the poles, the at least one of the discrete wires encloses a distal end and sides of the hollow space.

14. The electromagnetic device of claim 11, wherein the layers of the at least one of the discrete wires forming a throat and a crossing section of each of the poles extend continuously through the throat and the crossing section and are bent relative to the throat to form the crossing section adjacent an innermost end of the throat.

15. The electromagnetic device of claim 11, wherein the binder includes one of: a ceramic or a silicon material.

16. The electromagnetic device of claim 11, wherein the at least one discrete wire is made of a paramagnetic material that carries magnetic flux induced by the electrically conductive wire winding.

17. The electromagnetic device of claim 11, wherein each of the poles has a T-shaped cross-section that is widest toward the moveable unit, and a circular periphery of the stator includes another set of discrete wires wrapping around the stator unit.

18. The electromagnetic device of claim 11, wherein each of the poles has a flared cross-section that is widest toward the moveable unit, and a circular periphery of the stator unit includes another set of discrete wires wrapping around the stator unit.

19. The electromagnetic device of claim 11, wherein the stator unit is part of an electric motor or electricity generator.

20. The electromagnetic device of claim 1, further comprising layers of at least one discrete wire are formed by multiple discrete wires that primarily extend in a longitudinal direction in an abutting relationship.

21. The electromagnetic device of claim 1, further comprising layers of at least one of the discrete wires are formed by a single continuous wire having a plurality of runs that abut one another.

22. The electromagnetic device of claim 1, wherein at least one of the discrete wires defines a majority of each of the poles with hollow space located in a center of each of the poles, the at least one of the discrete wires encloses a distal end and sides of the hollow space, and the hollow space having a T-shape.

23. The electromagnetic device of claim 1, wherein the at least one of the discrete wires, forming a throat and a crossing section of each of the poles, extends continuously through the throat and the crossing section and are bent relative to the throat to form the crossing section, and the crossing section is adjacent an innermost distal end of the throat.

24. The electromagnetic device of claim 1, wherein the discrete wires are secured together with the binder which includes one of: a polymeric resin, a ceramic or a silicon material.

25. The electromagnetic device of claim 1, wherein the structural outer wall surrounding all of the poles of the stator unit includes the at least one of the discrete wires wound multiple times in a stacked manner to circularly surround the outermost portions of all of the poles.

26. The electromagnetic device of claim 25, wherein the members each have a rectangular or square cross-sectional shape to facilitate the members being stacked together.

* * * * *